United States Patent
Gallup et al.

(10) Patent No.: US 10,507,961 B2
(45) Date of Patent: Dec. 17, 2019

(54) ORGANIZING DEVICE WITH FLEXIBLE TIES

(71) Applicant: Nite Ize, Inc., Boulder, CO (US)

(72) Inventors: Eric Gallup, Rochester, MI (US); Bowden Ormsbee, Longmont, CO (US); Peter Zagone, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 147 days.

(21) Appl. No.: 14/434,707

(22) PCT Filed: Nov. 11, 2013

(86) PCT No.: PCT/US2013/069497
§ 371 (c)(1),
(2) Date: Apr. 9, 2015

(87) PCT Pub. No.: WO2014/075015
PCT Pub. Date: May 15, 2011

(65) Prior Publication Data
US 2016/0167853 A1    Jun. 16, 2016

Related U.S. Application Data

(60) Provisional application No. 61/724,814, filed on Nov. 9, 2012.

(51) Int. Cl.
*F16M 13/00* (2006.01)
*B65D 63/18* (2006.01)
(Continued)

(52) U.S. Cl.
CPC ............ *B65D 63/18* (2013.01); *A47G 29/08* (2013.01); *A47G 29/10* (2013.01); *B65D 63/04* (2013.01);
(Continued)

(58) Field of Classification Search
CPC ........ B65D 63/18; B65D 63/04; A47G 29/10; A47G 29/08; F21V 33/0004; F16B 1/00;
(Continued)

(56) References Cited

U.S. PATENT DOCUMENTS

| 2,862,626 A | 12/1958 | Clare |
| 3,406,821 A | 10/1968 | Weissberg |

(Continued)

FOREIGN PATENT DOCUMENTS

| CN | 1364225 A | 8/2002 |
| CN | 202469693 U | 10/2012 |

OTHER PUBLICATIONS

International Search Report in related PCT Application No. PCT/US2013/069497 dated Apr. 14, 2014 (4 pages).

(Continued)

*Primary Examiner* — Gwendolyn W Baxter
(74) *Attorney, Agent, or Firm* — Haynes and Boone, LLP

(57) ABSTRACT

An organizing device with rubberized twist ties. The organizing device includes a body piece and a back piece designed such that the back piece fits into the body piece to form an enclosed unit. The back piece can be fitted with various attachment devices, such as a suction cup or a magnet, for mounting the organizing device to different types of surfaces. The organizing device further includes small rubberized twist ties, threaded through the body piece, which can be used for hanging or securing small items from or securing items to the device.

2 Claims, 9 Drawing Sheets

(51) Int. Cl.

| | |
|---|---|
| *A47G 29/10* | (2006.01) |
| *A47G 29/08* | (2006.01) |
| *F21V 33/00* | (2006.01) |
| *B65D 63/04* | (2006.01) |
| *F16B 1/00* | (2006.01) |
| *F16B 2/08* | (2006.01) |
| *F16B 47/00* | (2006.01) |
| *F16M 13/02* | (2006.01) |

(52) U.S. Cl.
CPC ............... *F16B 1/00* (2013.01); *F16B 2/08* (2013.01); *F16B 47/00* (2013.01); *F16M 13/02* (2013.01); *F16M 13/022* (2013.01); *F21V 33/0004* (2013.01); *F16B 2001/0028* (2013.01); *F16B 2001/0035* (2013.01)

(58) Field of Classification Search
CPC .... F16B 2/08; F16B 47/00; F16B 2001/0028; F16B 2001/0035; F16M 13/02; F16M 13/022
USPC .................................................... 248/51, 160
See application file for complete search history.

(56) References Cited

U.S. PATENT DOCUMENTS

| | | |
|---|---|---|
| 3,858,578 A | 1/1975 | Milo |
| 4,936,466 A | 6/1990 | Nava |
| 5,310,376 A | 5/1994 | Mayuzumi et al. |
| 5,931,560 A * | 8/1999 | Hoffman ............... A63H 3/003 362/124 |
| 6,264,524 B1 | 7/2001 | Crane et al. |
| 6,672,577 B2 | 1/2004 | Murvine |
| D565,782 S * | 4/2008 | Opolka ......................... D26/51 |
| 8,282,439 B2 * | 10/2012 | Han ........................ A63H 3/04 446/374 |
| 2003/0020224 A1 | 1/2003 | Murvine |
| 2006/0151409 A1* | 7/2006 | Schmoelzer ........... A47G 25/06 211/85.9 |
| 2011/0260020 A1 | 10/2011 | Isserow et al. |
| 2011/0286217 A1 | 11/2011 | Martinson et al. |

OTHER PUBLICATIONS

Office Action issued in corresponding Chinese Patent App. No. 201380058257.6 dated May 31, 2017 with search report (14 pages).

* cited by examiner

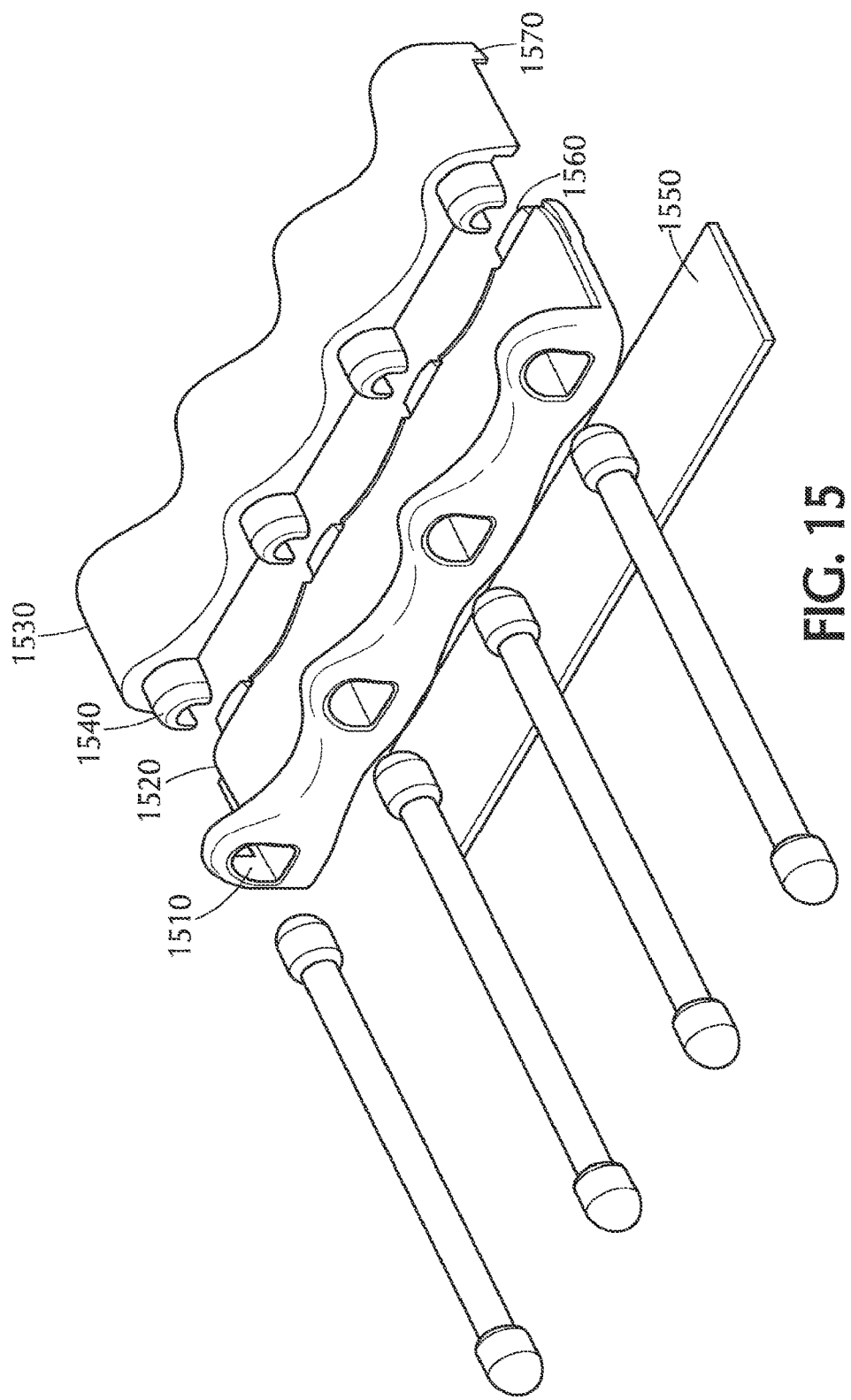

ORGANIZING DEVICE WITH FLEXIBLE TIES

CROSS-REFERENCE TO RELATED APPLICATIONS

This application is a national stage of PCT Patent Application No. PCT/US13/69497 filed Nov. 11, 2013, which claims the benefit of U.S. Provisional Patent Application No. 61/724,814 filed Nov. 9, 2012. The foregoing PCT and provisional applications are hereby incorporated by reference to the same extent as though fully disclosed herein.

BACKGROUND

There has long been a need for a simple yet versatile device for holding and organizing small items, especially a device which can quickly and easily be mounted to many different types of surfaces to hold the items in a convenient location. With the proliferation of electronic devices, such as cell phones and MP3 players and their associated charging cords, many people have an even greater need for such a device.

Existing organizing devices tend to suffer from a common shortcoming—that is, they are rigid and inflexible and cannot be configured to meet the varied needs of different consumers. In particular, existing organizing devices invariably do not have the required size or number of fingers for a particular user application, and they are not at all adept at organizing wires and cords such as those associated with computers and personal electronic devices.

There remains a need for an organizing device with simple and flexible mounting features which can be configured to hold or secure a wide variety of small items, including wires and cords.

SUMMARY

An organizing device with rubberized twist ties is disclosed. The organizing device includes a body piece and a back piece, designed such that the back piece fits into the body piece to form an enclosed unit. The back piece can be fitted with various attachment devices, such as a suction cup or a magnet, for mounting the organizing device to different types of surfaces. The organizing device further includes small rubberized twist ties, threaded through the body piece, which can be used for hanging small items from or securing items to the device. Hemispherical and semi-cylindrical shapes are disclosed for the organizing device, which may also include a small light.

In one embodiment, an organizing device includes a body piece, said body piece including a hollow interior volume, an exterior surface, and an interior surface. The device further includes a back piece, said back piece being attachable to the body piece to form an enclosure. The device further includes a plurality of rubberized twist ties passing through holes in the body piece, where the rubberized twist ties can be used to secure items to the organizing device, and the rubberized twist ties can be removed from the holes in the body piece. Optionally, the device includes a light. In one alternative, the light is a light emitting diode (LED) light located in the body piece of the organizing device. Optionally, the device includes an attachment device for attaching the organizing device to a mounting surface. Alternatively, the attachment device is a mounting tab integral with the body piece, said mounting tab including a hole therethrough suitable for attaching the organizing device to the mounting surface with a screw. In one configuration, the attachment device is a suction cup which is inserted into a hole in the back piece. In another configuration, the attachment device is selected from a group comprising a magnet, a piece of foam tape, and mating pieces of hook-and-loop fastener material, and the attachment device is affixed to the back piece via tape or another adhesive. Optionally, each end of each of the rubberized twist ties protrudes through one of the holes in the body piece, and a central portion of each of the rubberized twist ties remains inside the body piece. In one alternative, the rubberized twist ties are secured to the body piece by bosses on the interior surface of the body piece which trap the rubberized twist ties against the back piece. In another alternative, the body piece is hemispherical in shape and the back piece is round. Alternatively, the body piece is semi-cylindrical in shape and the back piece is rectangular, said organizing device further comprising a removable mounting tie wrap passing through the organizing device in a lengthwise direction, said mounting tie wrap being suitable for securing the organizing device to an object. Optionally, the body piece is made of a flexible rubber material, and the back piece is made of a plastic material. Alternatively, the back piece is attached to the body piece by inserting an outer edge of the back piece into a groove which is formed along a peripheral portion of the interior surface of the body piece.

In another embodiment, an organizing device includes a body; a plurality of rubberized twist ties, the body configured to hold the plurality of rubberized twist ties; and an attachment mechanism connected to the body, the attachment mechanism for attaching the body to a surface. Optionally, the body includes a plurality of slots on a front surface of the body, the plurality of slots oriented in slot pairs, each of the slot pairs holding a first end and a second end of one of the plurality of rubberized twist ties, each slot of the plurality of slots having a first opening and a second opening at either end of the slot and a break in the slot, the break having a width, the width being less than an uncompressed diameter of each of the plurality of rubberized twist ties. Alternatively, a back surface of the body includes the attachment mechanism, and the attachment mechanism is an adhesive. In one configuration, the body includes a plurality of channels for receiving a wire, adjacent to each of the plurality of channels the body includes an aperture through which one of the plurality of twist ties passes from an interior of the body to an exterior of the body, and adjacent to each of the plurality of channels the body includes a raised receiver slot, the raised receiver slot having a first opening and a second opening at either end of the raised receiver slot and a break in the raised receiver slot, the break having a width, the width being less than an uncompressed diameter of each of the plurality of rubberized twist ties, such that each of the plurality of rubberized twist ties may be compressed and removed from the raised receiver slot. In another configuration, a back surface of the body includes the attachment mechanism, the attachment mechanism is an adhesive, and the back surface of the body is shaped to mirror a corner, such that a first portion of the back surface is at an angle to a second portion of the back surface. Optionally, the body includes a plurality of paired apertures, each of the plurality of paired apertures holding a first end and a second end of a twist tie of the plurality of twist ties such that a loop in the twist tie is formed, the twist tie held in the paired apertures by a first end cap and a second end cap of the twist tie, an uncompressed width of the first and second end caps of the twist tie being greater than a width of the paired apertures. Alternatively, each of the plurality of paired apertures is adjacent to a labeling area, the labeling area for indicating an identity of an object held by the twist tie associated with the paired apertures adjacent.

In another embodiment, an organizing device includes a body piece, said body piece being hemispherical in shape and including a hollow interior volume, an exterior surface, and an interior surface. The device further includes a round back piece, said back piece being attachable to the body piece to form an enclosure and a light. The device further includes a plurality of rubberized twist ties passing through holes in the body piece, where the rubberized twist ties can be used to secure items to the organizing device, and the rubberized twist ties can be removed from the holes in the body piece; and an attachment device affixed to the back piece, where the attachment device is selected from a group consisting of a suction cup, a magnet, a piece of foam tape, and mating pieces of hook-and-loop fastener material. Optionally, the light is a light emitting diode (LED) light located in the body piece of the organizing device. Alternatively, each end of each of the rubberized twist ties protrude through one of the holes in the body piece, a central portion of each of the rubberized twist ties remains inside the body piece, and the rubberized twist ties are secured to the body piece by bosses on the interior surface of the body piece which trap the rubberized twist ties against the back piece. Optionally, the back piece is attached to the body piece by inserting an outer edge of the back piece into a groove which is formed along a peripheral portion of the interior surface of the body piece.

In another embodiment, an organizing device includes a body piece, said body piece being elongated and semi-cylindrical in shape and including a plurality of holes therethrough. The device further includes a light emitting diode (LED) light located in the body piece. The device further includes a plurality of rubberized twist ties passing through the holes in the body piece, where the rubberized twist ties can be used to secure items to the organizing device, and the rubberized twist ties can be removed from the holes in the body piece. The device further includes a mounting tie wrap passing through holes in both ends of the body piece, where the mounting tie wrap can be used to secure the organizing device to a structure, and the mounting tie wrap can be removed from the organizing device. The device further includes one or more attachment devices affixed to the organizing device, where the one or more attachment devices is selected from a group comprising a suction cup, a magnet, a piece of foam tape, and mating pieces of hook-and-loop fastener material. Optionally, the device further includes a rectangular back piece, said body piece having a hollow interior volume, an exterior surface, and an interior surface, and said back piece being attachable to the body piece to form an enclosure. Alternatively, each end of each of the rubberized twist ties protrudes through one of the holes in the body piece, a central portion of each of the rubberized twist ties remains inside the body piece, and the rubberized twist ties are secured to the body piece by bosses on the interior surface of the body piece which trap the rubberized twist ties against the back piece.

In another embodiment, a cord organizer includes an upper and lower body portion, the lower portion having apertures for receiving a plurality of twist ties, the upper body portion having a plurality holders to secure the plurality of twist ties when the upper and lower portion are secured together. Optionally, this is via snap fit arrangement. In one configuration, the plurality of holders are U shaped and have a maximum width that is less than the capped end of the twist tie, thereby holding the plurality of twist ties in place. Optionally, an attachment mechanism such as an adhesive strip is included on the lower body portion.

Additional features will become apparent from the following description and appended claims, taken in conjunction with the accompanying drawings.

BRIEF DESCRIPTION OF THE DRAWINGS

FIG. 15 shows another embodiment of a cord organizer;

DETAILED DESCRIPTION OF THE EMBODIMENTS

The following discussion of the embodiments of an organizing device with flexible ties is merely exemplary in nature and in no way is intended to limit the organizing devices or its applications or uses.

Many people have a need for a simple organizing device for holding small items. One example is the need to hold keys and sunglasses in a convenient location around a home. Another example, particularly relevant with the proliferation of personal electronic devices, is the need to organize charging cords—that is, to keep the plugs from falling on the floor, while still allowing the cords to move freely—around a desk, in a car, or elsewhere. An organizing device as disclosed herein could serve these functions.

Modern materials and manufacturing processes make it possible to design an organizing device which meets the need described above, while at the same time being inexpensive, lightweight, and flexible in mounting configuration.

Three different embodiments of an organizing device are described and shown in this disclosure. Other embodiments are also possible.

Figure 1:
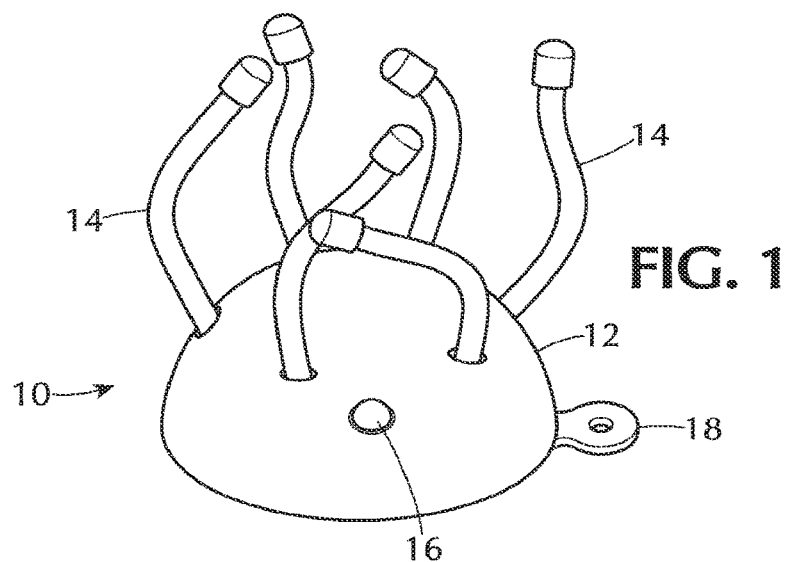
FIG. 1 is an illustration of a first embodiment of an organizing device with rubberized twist ties.

FIG. 1 is an illustration of a first embodiment of an organizing device 10. Shown in FIG. 1 are a body piece 12, a plurality of rubberized twist ties 14, a light 16, and a mounting tab 18. In the first embodiment, the body piece 12 is hemispherical in shape and is a single piece of molded rubber. The body piece 12 is a fairly thin shell, generally hollow on the inside, as will be discussed in detail below.

The rubberized twist ties 14 are incorporated into the design of the organizing device 10, allowing a user to secure any number of different types of items to the outside of the body piece 12. In the figures, three of the rubberized twist ties 14 are shown, where both ends of each of the rubberized twist ties 14 protrude from the body piece 12, and a central portion of each of the rubberized twist ties 14 passes through the interior of the body piece 12. In practice, more or fewer than three of the rubberized twist ties 14 could be used. Thus, the user has the flexibility to use as many of the rubberized twist ties 14 as desired and configure them as needed. The rubberized twist ties 14 are of a style which is commonly available on the market, comprised of a metal wire encased in rubber.

The light 16 optionally may be included in the organizing device 10 as a convenience feature, with a location off-center in the body piece 12 being shown. The light 16 also, of course, could be placed in the center of the body piece 12. The light 16 most preferably would have a low physical profile, low energy consumption properties, and low heat generation. A small light emitting diode (LED) for the light 16 is envisioned as a preferred embodiment. A switch (not shown) could be built into the light 16 or placed adjacent to it. A small battery (not shown) could also be built into the light 16, or could be provided anywhere in or on the organizing device 10 as appropriate.

The mounting tab 18 allows a screw (not shown) to be used to semi-permanently attach the organizing device 10 to a surface. The mounting tab 18 and screw would be suitable for use in a situation where a user wants to mount the organizing device 10 in a certain location and leave it there—such as near a door in a home, where the organizing device 10 would be used to hold items such as keys and sunglasses. Other attachment methods, discussed below, would obviate the need for the mounting tab 18 in some situations.

In one configuration of the organizing device 10, the body portion 12 has a diameter of about 3 inches. Larger or smaller designs may also be suitable for some purposes.

Figure 2:
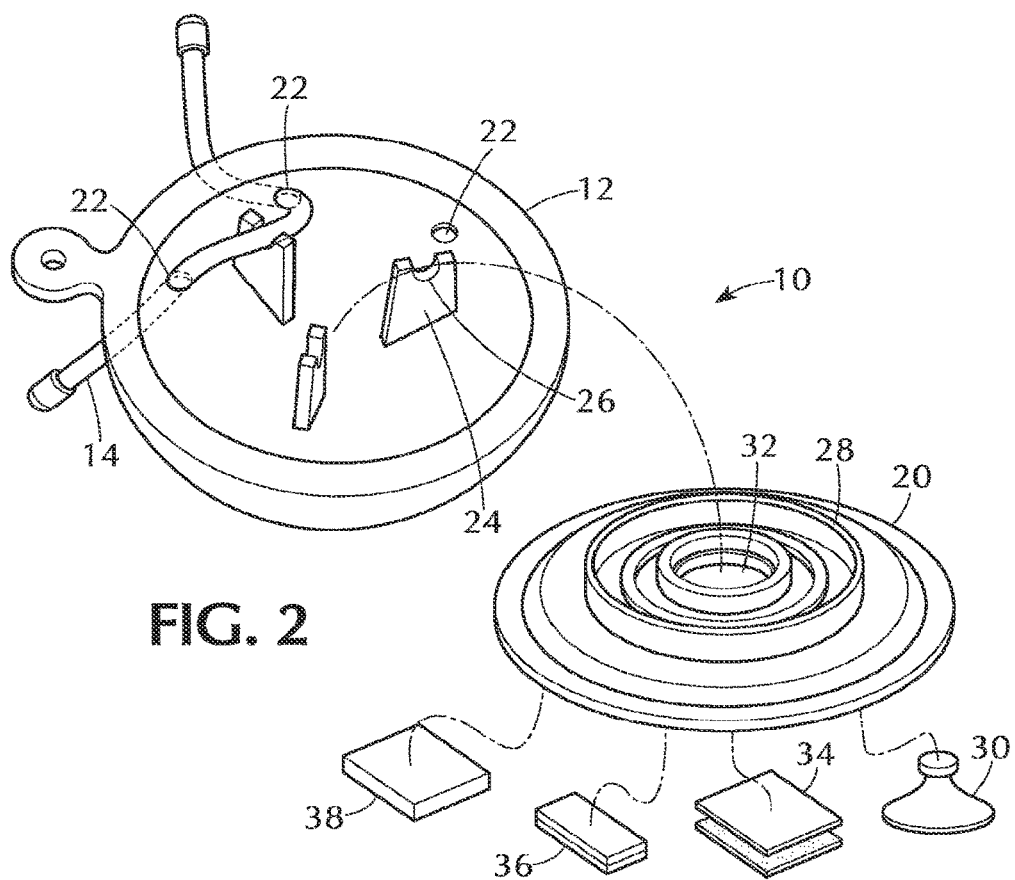
FIG. 2 is an exploded view illustration of the first embodiment of the organizing device of FIG. 1, showing how a body piece, a back piece, and an assortment of attachment devices are assembled.

FIG. 2 is an exploded view illustration of the first embodiment of the organizing device 10 of FIG. 1, showing how the body piece 12, a back piece 20, and an assortment of attachment devices are assembled. As mentioned above, the body piece 12, which is seen from below in FIG. 2, is molded of a firm but flexible rubber material and is generally hollow on the interior. A back piece 20, preferably molded of a hard plastic, fits in the opening in the bottom of the body piece 12, thus enclosing the organizing device 10. The body piece 12 includes several holes 22, with two of the holes 22 needed for each of the rubberized twist ties 14. One of the rubberized twist ties 14 is shown threaded through two of the holes 22 in FIG. 2. The holes 22 may be just large enough in diameter for the tips of the rubberized twist ties 14 to pass through.

Figure 3:
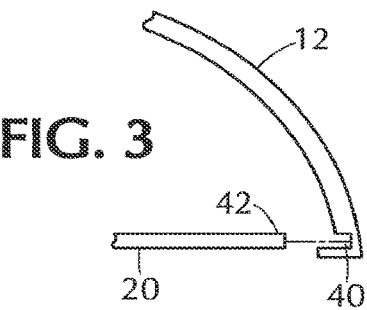
FIG. 3 is a section view of the first embodiment of the organizing device of FIGS. 1 and 2, showing how the back piece fits into the body piece.

In order to hold the rubberized twist ties 14 securely in position in the organizing device 10, the body piece 12 further includes a plurality of bosses 24. In this embodiment, three of the bosses 24 are included to support the three rubberized twist ties 14. Each of the bosses 24 includes a channel 26, designed such that one of the rubberized twist ties 14 can fit down into the channel 26. The back piece 20 includes a ring rib 28 of a diameter designed to align with the channels 26 in the three bosses 24. Thus, when the back piece 20 is inserted into the opening in the bottom of the body piece 12, the ring rib 28 presses against the rubberized twist ties 14, holding them securely in position in the channels 26. Details of the fit of the back piece 20 into the body piece 12 are shown in FIG. 3 and discussed below.

Although the organizing device 10 could sit freely on a horizontal surface, such as a desk, it is expected that in most applications the user will want to attach the organizing device 10 to some surface. A variety of attachment devices are included for this purpose. A suction cup 30 would be suitable for attachment of the organizing device 10 to very smooth surfaces, such as glass and metal. A portion of the suction cup 30 would be inserted through a hole 32 in the back piece 20, such that the suction cup 30 is operable to hold the bottom of the organizing device 10 against the desired surface.

Other attachment devices include mating pieces of hook-and-loop fastener material 34, foam tape 36, and a magnet 38. The hole 32 in the back piece 20 would not be needed for the hook-and-loop fastener material 34, the foam tape 36, and the magnet 38, as they would all be affixed to the back piece 20 via tape or some other adhesive. Thus, for the attachment devices 34-38, the hole 32 could be omitted from the back piece 20, or the attachment devices 34-38 simply could be placed over and cover the hole 32. The hook-and-loop fastener material 34, being comprised of two detachable pieces, could be used to provide a firm attachment of the organizing device 10 to a surface while still allowing the organizing device 10 to be removed as needed. The foam tape 36 would provide a semi-permanent attachment of the organizing device 10 to a surface. The magnet 38, of course, would provide a firm yet relocatable attachment of the organizing device 10 to a ferrous metal object. Using the hook-and-loop fastener material 34 or the foam tape 36, it would be possible to stick two of the organizing devices 10 together back to back to make a ball.

The mounting tab 18 ordinarily would not be needed when one of the attachment devices (30, 34-38) is used. In this situation, the mounting tab 18 could remain attached to the organizing device 10 and unused, or the mounting tab 18 could be removed from the organizing device 10 by the user.

The organizing device 10 thus would be assembled as follows. From the interior of the body piece 12, the rubberized twist ties 14 would first be inserted through the holes 22, while pressing a central portion of each of the rubberized twist ties 14 into one of the channels 26 in the bosses 24. One of the attachment devices (30, 34-38) would be selected and affixed to the back piece 20. The back piece 20 then would be inserted into the body piece 12, thus forming a complete enclosed assembly and holding the rubberized twist ties 14 securely in position.

FIG. 3 is a section view of the first embodiment of the organizing device 10 of FIGS. 1 and 2, showing how the back piece 20 fits into the body piece 12. The body piece 12 is formed with a groove 40 running around the periphery of its interior surface, along the lower inside edge. Outer edge 42 of the back piece 20 fits in the groove 40, thus holding the back piece 20 in place in the body piece 12. As mentioned previously, the body piece 12 is formed of a firm yet flexible rubber, and the back piece 20 is molded of a hard plastic. The body piece 12 would have to be flexed in order to insert the back piece 20. Once the back piece 20 is squeezed in place in the groove 40, the body piece 12 would return to its nominal shape and assembly would be complete.

Figure 4:
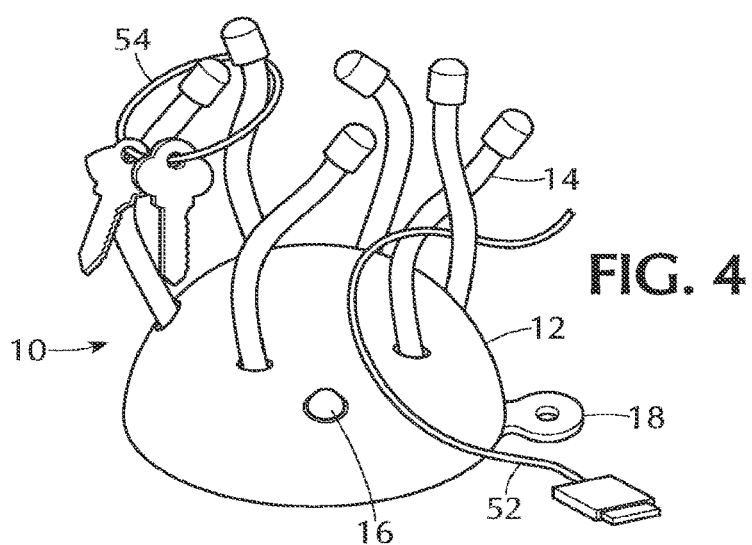
FIG. 4 is an illustration of the first embodiment of the organizing device of FIGS. 1-3, shown in a typical usage.

FIG. 4 is an illustration of the first embodiment of the organizing device 10 of FIGS. 1-3, shown in a typical usage. In the application shown in FIG. 4, the organizing device 10 might be attached to a side of a desk in a dormitory room, where the organizing device 10 could be used to hold a charging cord 52 in place and to hang a set of keys 54. The configurability of the rubberized twist ties 14 allows almost unlimited possibilities for what can be done with the organizing device 10.

Figure 5:
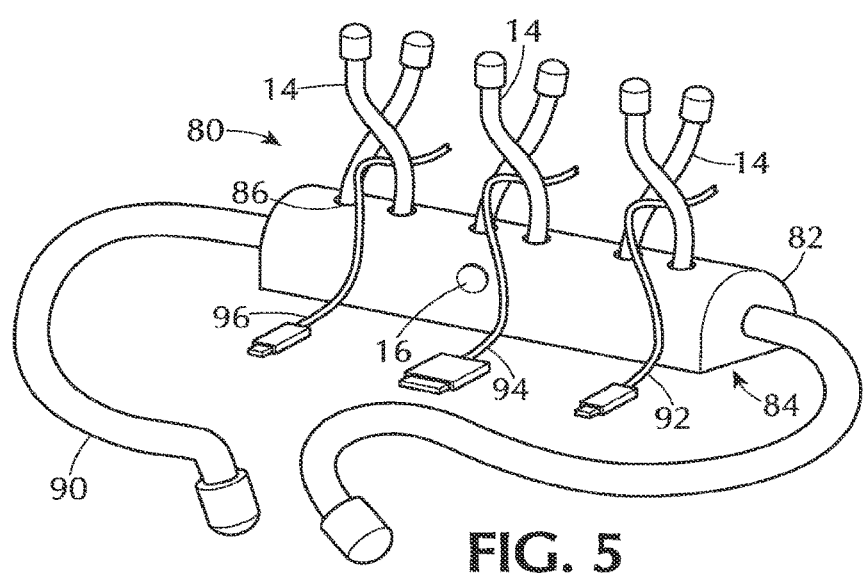
FIG. 5 is an illustration of a second embodiment of an organizing device with rubberized twist ties.

FIG. 5 is an illustration of another embodiment of an organizing device 80. The organizing device 80 is a semi-cylindrical shape for applications where a more linear layout is needed. Of course, the cross sectional shape of the organizing device 80 need not be exactly as shown in FIG. 5. Many variations are possible, while still providing a substantially different form factor than the organizing device 10 discussed previously.

The organizing device 80 is comprised of a body piece 82 and a back piece 84 which are assembled in a fashion similar to that shown for the body piece 12 and the back piece 20 of the organizing device 10. That is, the body piece 82 preferably would be constructed of a rubber material which could be flexed to allow the back piece 84 to be inserted into a groove running along the lower inside edge of the body piece 82. The body piece 82 could similarly include bosses on its interior for capturing the rubberized twist ties 14 and holding them in position.

In the organizing device 80 shown in FIG. 5, three of the rubberized twist ties 14 are shown protruding through holes 86 which run along the center line of the body piece 82. In practice, other hole patterns could be provided, such as two adjacent rows of the holes 86 or a staggered hole pattern, and more than three of the rubberized twist ties 14 could be used. Similarly, the body piece 82 in FIG. 5 has the holes 86 unevenly spaced in pairs, but this is not mandatory. As discussed previously, the ability to insert the rubberized twist ties 14 into the holes 86 in different arrangements gives the user the flexibility to use as many of the rubberized twist ties 14 as desired, and to configure them as needed.

The organizing device 80 preferably also would include a mounting tie wrap 90 which could be wrapped around a tree branch or a post to secure the device 80 in an ad hoc fashion. This type of attachment of the device 80 would be advantageous for a hunter in a tree, or a fisherman on a pier, for example, where the device 80 could be mounted using the mounting tie wrap 90 and then small objects, such as game calls or lures, could be secured by the twist ties 14. The rubber and plastic construction of the device 80 would allow it to flex somewhat to conform to the shape of a tree branch or post when mounted with the mounting tie wrap 90. The mounting tie wrap 90 preferably would be of a heavier construction than the twist ties 14, would be removable from the organizing device 80 when not needed, and could be secured in place within the device 80 via a mounting boss feature as disclosed for the organizing device 10 and shown in FIG. 2.

The organizing device 80, being more linear and elongated in shape than the organizing device 10, also may be particularly well suited to usage on a desk, where it can serve to hold charging cords and power cords in position, keeping the cords organized and preventing the cords from falling on the floor. To this end, the organizing device 80 is shown in FIG. 5 securing cords 92, 94 and 96—keeping the plugs in a convenient location while still allowing the cords 92-96 to be extended as needed. The organizing device 80 also may be used for holding keys and sunglasses, keeping these items separated, visible, and organized.

The organizing device 80 would include attachment devices equivalent to those shown in FIG. 2 for the organizing device 10. Two of each of the suction cup 30, the hook-and-loop fastener material 34, the foam tape 36, and the magnet 38 would be used to support the longer shape of the organizing device 80. In a preferred embodiment, the organizing device 80 would have a length of 6 to 8 inches. The cross-section of the organizing device 80 would be about an inch and a half in width and height. Other sizes, larger or smaller, of course are possible and may be desirable for certain applications.

Figure 6:
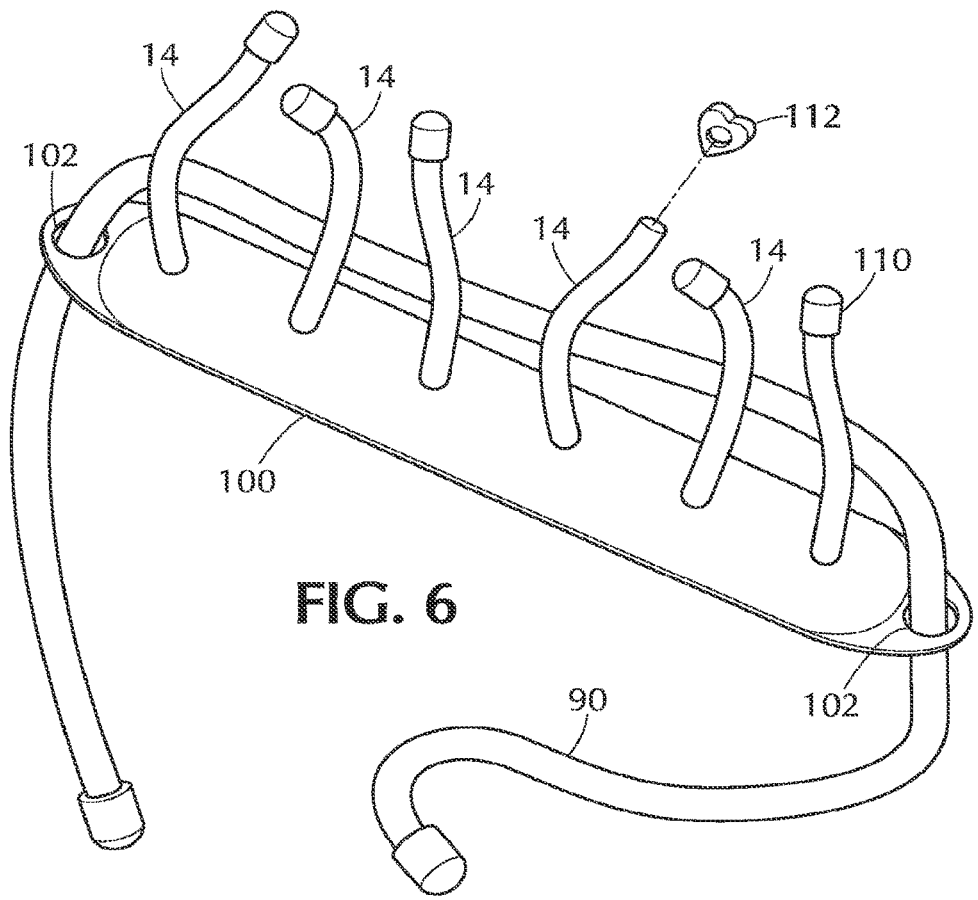
FIG. 6 is an isometric view illustration of a third embodiment of an organizing device with rubberized twist ties.
Figure 7:
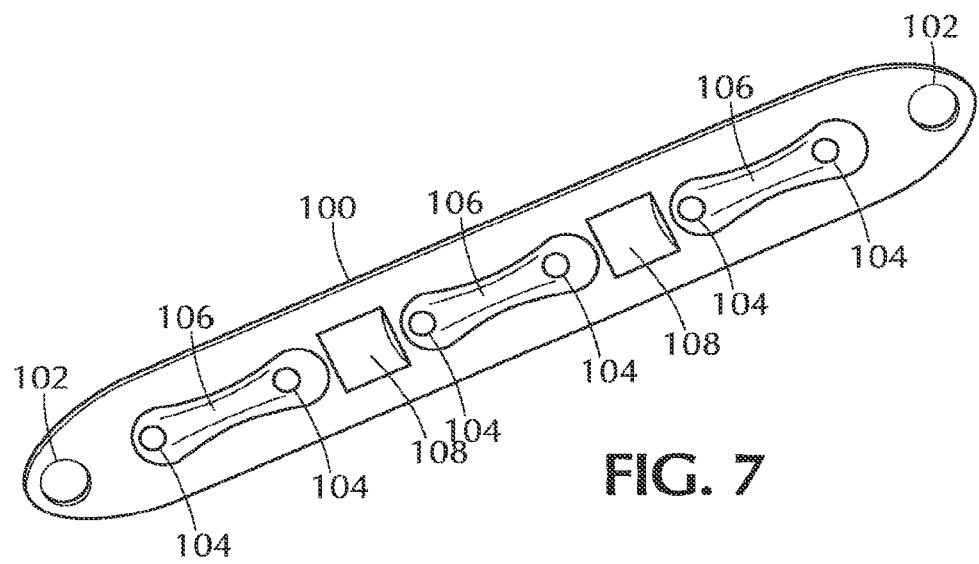
FIG. 7 is a bottom view illustration of the third embodiment of the organizing device shown in FIG. 6.

In another design embodiment, an organizing device 100 could be made in a single-piece construction, as shown in FIGS. 6 and 7. FIG. 6 is an isometric view of the organizing device 100 which, like the organizing device 80, has an elongated shape. The organizing device 100 preferably would be made of a rubber material to allow flexing, would include several of the rubberized twist ties 14 for use as described previously, and would include the attachment devices 34-38. The organizing device 100 also includes the mounting tie wrap 90, which passes through holes 102 formed in each end of the device 100. The mounting tie wrap 90, if not needed, can be removed from the holes 102.

FIG. 7 is a bottom view of the organizing device 100, showing several design features. Holes 104 are arranged in pairs, with each pair of the holes 104 encompassed by a recess 106. Both ends of one of the rubberized twist ties 14 can be inserted into a pair of the holes 104 from the bottom, such that the ends of the rubberized twist tie 14 protrude out of the top of the device 100 as shown in FIG. 6, while the middle portion of the rubberized twist tie 14 lies within the recess 106. The organizing device 100 shown in FIGS. 6 and 7 includes three pairs of the holes 104, but more or fewer are possible depending on the length of the device 100. Cavities 108 may also be included to reduce weight and material consumption, and also to increase the flexibility of the organizing device 100.

A decorative button 112 could be added to the rubberized twist ties 14 used with any of the organizing devices 10, 80, or 100. To apply the decorative button 112 to the rubberized twist tie 14, cap 110 would first have to be removed. In one design embodiment, the decorative button 112 could be a flat two-dimensional shape with a hole all the way through it, such that the decorative button 112 is slid onto the rubberized twist tie 14 with a slight interference fit, and then the cap 110 is replaced on the end of the rubberized twist tie 14. In another design embodiment, the decorative button 112 could be a three-dimensional shape with a hole in the bottom of it, such that the decorative button 112 is pressed onto the end of the rubberized twist tie 14, either taking the place of the cap 110, or directly onto the cap 110.

Many different applications for the organizing devices 10, 80, or 100 are easily envisioned. The devices 10, 80, or 100 could be used in a car to keep charging cords and audio cords organized. The devices 10, 80, or 100 could be placed on a wall or appliance in a kitchen, where they could be used to hold small kitchen utensils. On a desktop or a computer case, the devices 10, 80, or 100 would be ideal for organizing power cords, as shown in FIG. 5. The devices 10, 80, or 100 also could be placed anywhere there is a need for holding and organizing miscellaneous small items—such as on a wall near a door or on or near a bed. The variety of attachment methods, and the flexibility in placing and shaping the rubberized twist ties 14, allow the organizing devices 10, 80, or 100 to be used for a wide variety of purposes.

Figure 8:
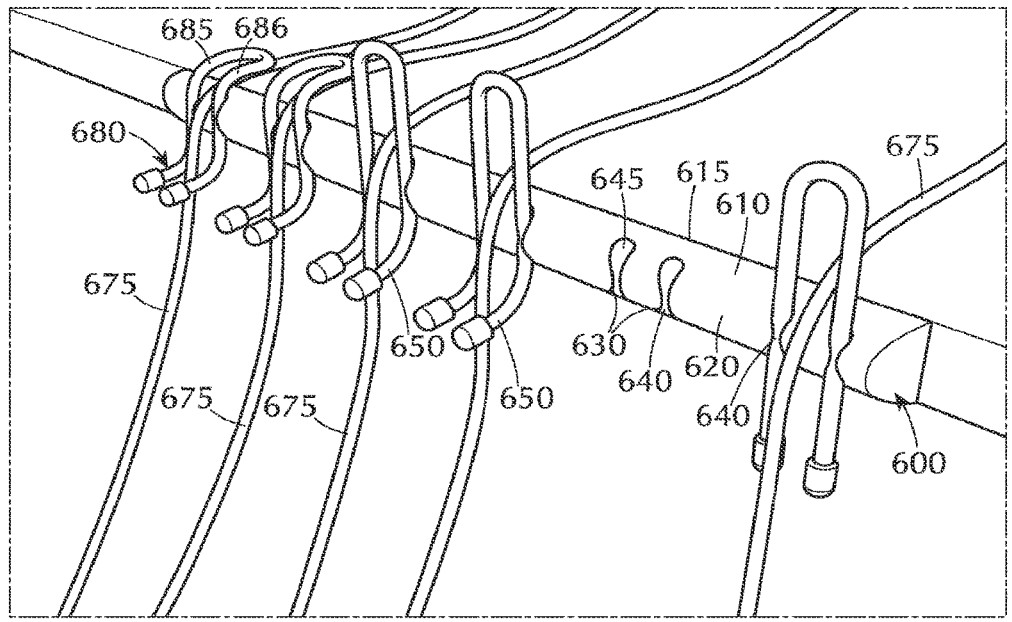
FIG. 8 shows another embodiment of an organizing device.

FIG. 8 shows another embodiment of an organizing device 600. In this embodiment, a single one piece body 610 includes a flat side 615 and a rounded side 620. Flat side 615 may include an adhesive or an adhesive strip, suction cups, or other attachment system. In one alternative, screws (or other attachment mechanisms) may be placed through holes in organizing device 600 to more permanently hold it in place. In another embodiment, the material that composes organizing device 600 may easily be screwed into or hammered into. In rounded side 620, there is a plurality of paired slots 630. A rubberized twist tie 650 may be utilized in each of these slots. Each of the paired slots 630 is slightly less that the width of rubberized twist tie 650, so some friction is experienced; however, the twist ties 650 may still be slid up and down in the slots. In some embodiments, the paired slots 630 may be configured with a looser configuration so that the twist ties 650 are easily slid. Each slot also has a break 640. Break 640 is appropriately sized such that the twist tie 650 may be compressed and pulled out of break 640. The size of the opening 645 at the top and the bottom of each slot 630 is sized such that the twist tie 650 may not be pulled through due to end caps 655.

Figure 9:
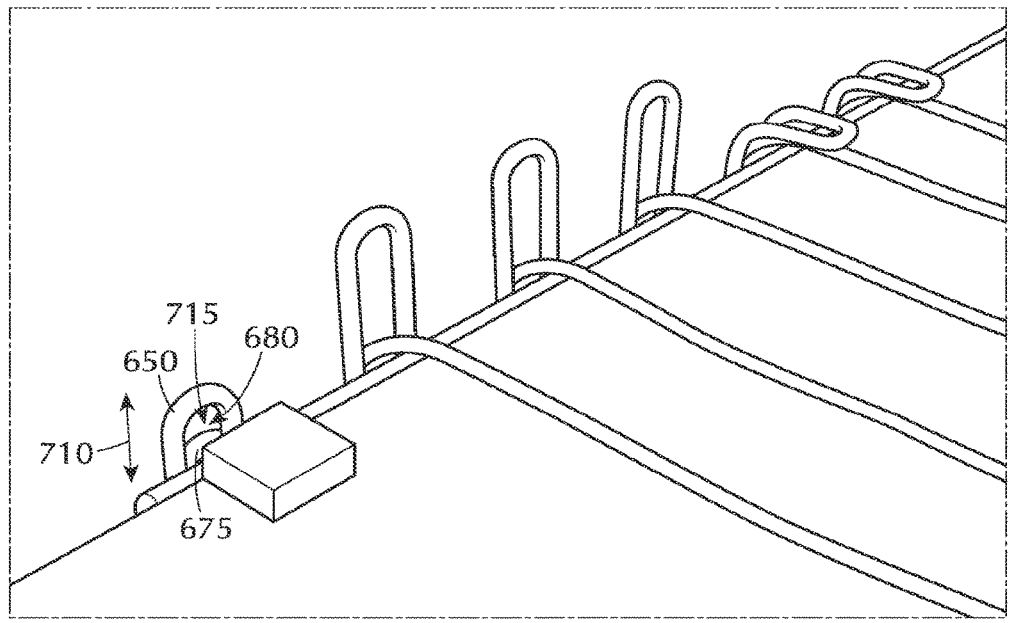
FIG. 9 shows another view of the organizing device of FIG. 8.

As shown, cords 675 may be held in a variety of fashions. They may be held by pressing the tips 680 together around cord 675. Twist tie 650 may be bent down on a cord 675 that passes through the aperture 686 formed by a twist tie 650 resident in a "U" shape in organizing device 600. As shown in FIG. 9, twist tie 650 may be slid up and down 710 around a cord 675 that passes through aperture 680 engaging the cord 675 with the U-shaped portion 715 of twist tie 650. Although organizing device 600 is shown with a certain number of paired slots, more or fewer slots may be utilized. Also in an alternative, only a single slot may be used, and the twist tie 650 may be wrapped about a cord 675 in order to hold it in place.

Figure 10:
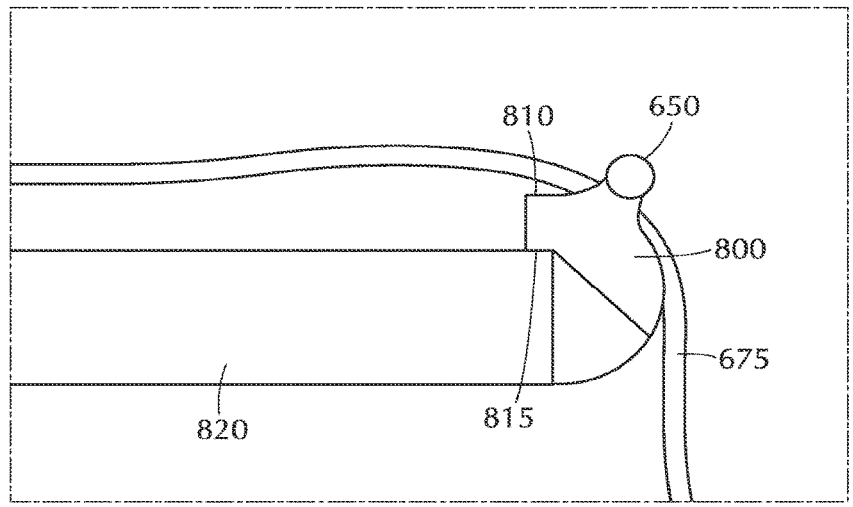
FIG. 10 shows another embodiment of an organizing device.

In another embodiment as shown in FIG. 10, a cord organizer 800 includes a rounded face 810 and an angled face 815. Twist tie 650 is configured to hold power cord 675. Similar to organizing device 600 as discussed in relation to cord organizer 800, angled face 815 has an adhesive to attach it to table 820. In alternatives, other attachment mechanisms may be used such as screws, suction cups, etc. Angled face 815 is selected to mirror the curve or angle of table 820 and is not limited to the angle shown.

Figure 11:
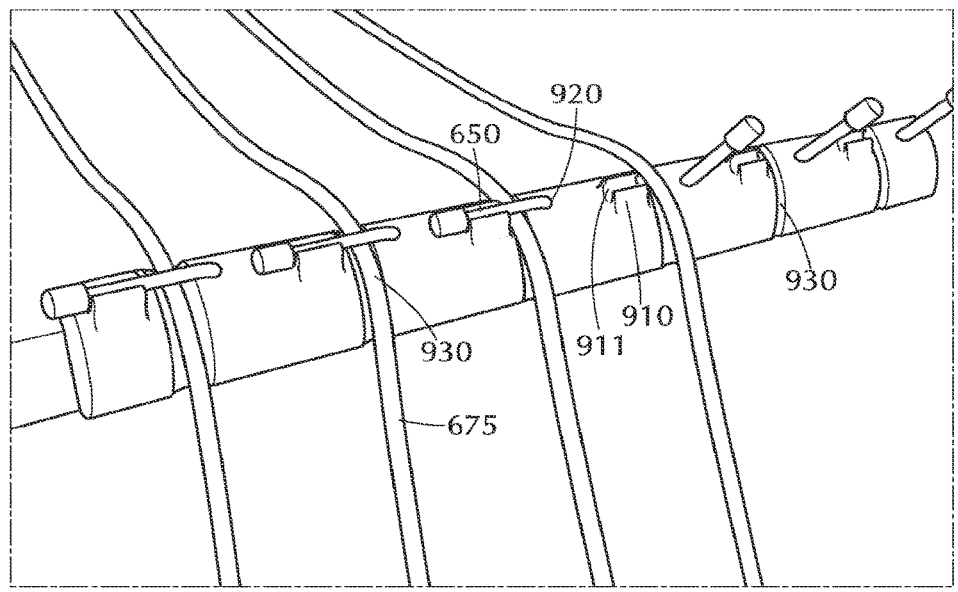
FIG. 11 shows another view of the organizing device of FIG. 10.

As shown in FIG. 11, the cord organizer 800 includes a receiver slot 910 for twist tie 650. The opening 911 for raised receiver slot 910 is less than the width of twist tie 650, so that twist tie 650 may be compressed to enter and exit slot 910. Cords 675 may be placed in channels 930. Twist ties 650 exit the body of cord organizer 800 through apertures 920. Apertures 920 are sized so that twist ties 650 may be removed with significant compression of end caps 655. The interior of cord organizer 800 is hollow and, typically, cord organizer 800 is composed of two pieces, a front portion and a back portion.

Figure 12:
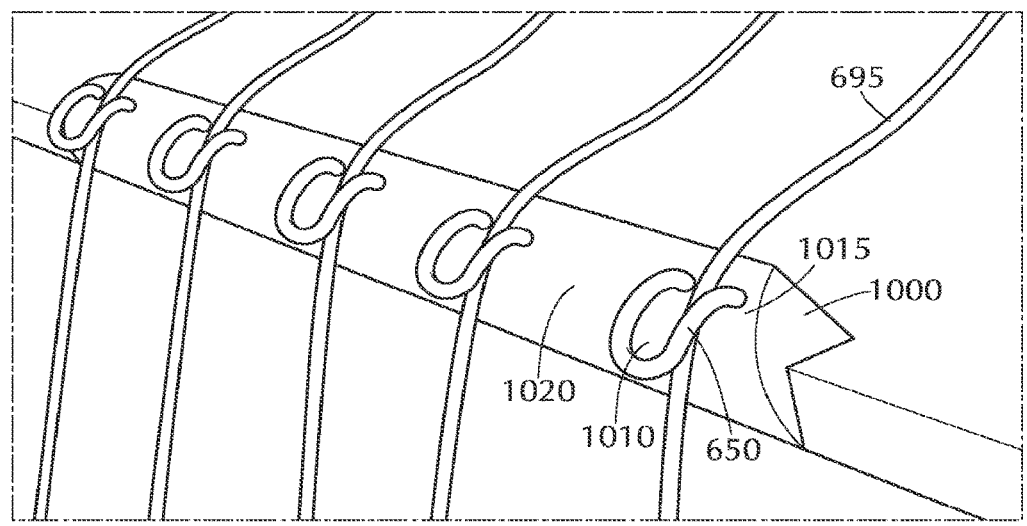
FIG. 12 shows another embodiment of an organizing device.
Figure 13:
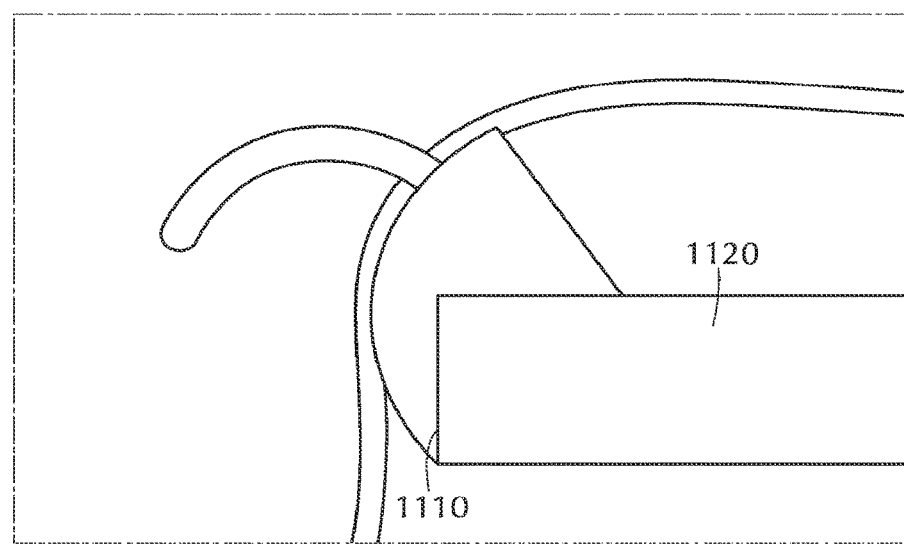
FIG. 13 shows another view of the organizing device of FIG. 12.
Figure 14:
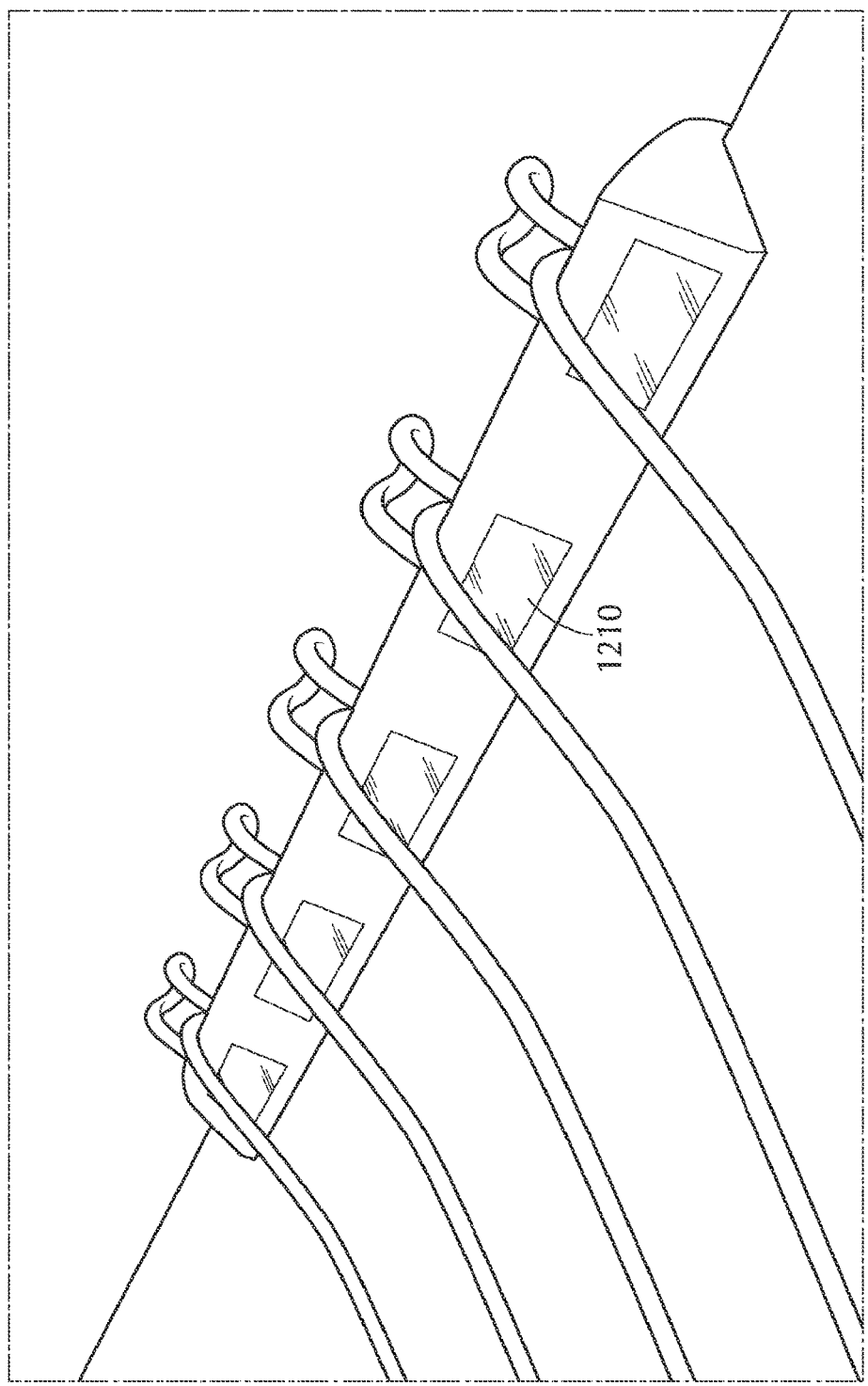
FIG. 14 shows another view of the organizing device of FIG. 12.

FIG. 12 shows another embodiment of a cord organizer 1000. Similar to the previous embodiments, cord organizer 1000 includes a plurality of twist ties 650 having an aperture 1010 through which cord 675 may be placed. Cord organizer 1000 includes a plurality of paired apertures 1015 in body piece 1020, through which twist ties 650 may be placed by compressing the end cap 655. Each aperture is sized to be slightly less that the width of the end cap, allowing for holding, but also removal by compressing the end cap 655. Alternatively, only a single aperture may be provided. Cord 675 may be secured simply by twisting twist tie 650. As shown in FIG. 13, cord organizer 1000 includes an angled back 1110 for interfacing with surface 1120 and includes a complementary shape. Similar to organizing device 600 as discussed in relation to cord organizer 1000, angled face 1110 has an adhesive to attach it to table 1120. In other alternatives, other attachment mechanisms may be used such as screws, suction cups, etc. In FIG. 14, a labeling window 1210 is shown for labeling what the cords belong to.

Figure 16A:
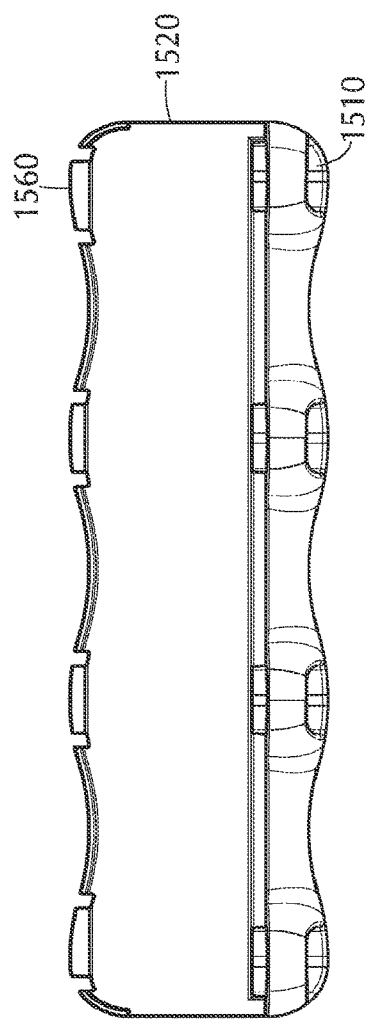
FIG. 16a shows a top view of the lower body portion of the cord organizer of FIG. 15.
Figure 16B:
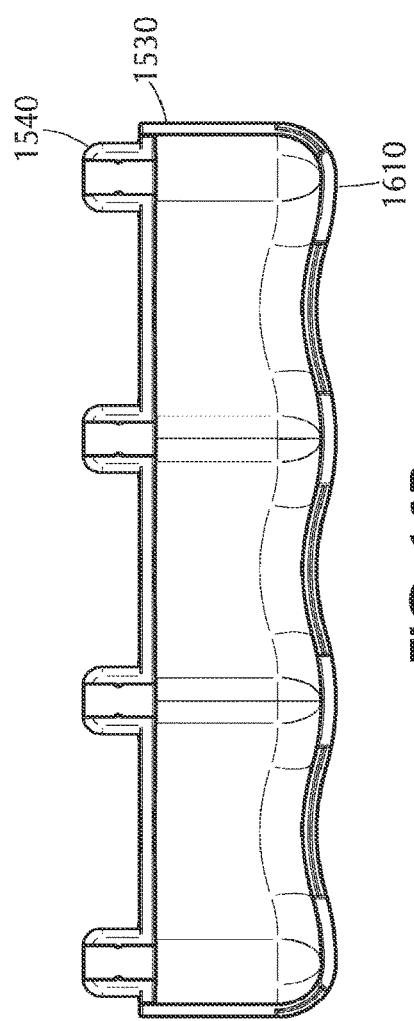
FIG. 16b shows a bottom view of the upper body portion of the cord organizer of FIG. 15.

In FIG. 15 another embodiment of a cord organizer is shown. Twist ties 650 may be placed through apertures 1510 in lower body 1520. Apertures 1510 are sized such that they are wider than the capped ends of twist ties 650. Upper body portion 1530 may be snap fitted into lower body portion 1520. Holders 1540 may have a diameter that is less than that of the capped ends of twist ties 650 and approximately the same as the diameter of the body of twist ties 650. Therefore, when upper body portion 1530 is snapped into place with tabs 1560 into the lower portion 570 of upper body portion 1530 which includes apertures for receiving the tabs, the twist ties 650 will be held in place. The lower body portion 1520 also includes an attachment mechanism 1550, which in this case is an adhesive strip; however, numerous other attachment mechanisms may be used similar to as described above. FIG. 16a shows a top view of lower body portion 1520 where apertures 1510 and tabs 1560 may clearly be seen. In FIG. 16b, apertures 1610 for receiving tabs 1560 and holders 1540 are clearly visible from the bottom view of upper portion 1530.

The embodiments of FIGS. 6-12 may be combined and configured in different arrangements, combining pieces from one of the embodiments to other embodiments. Essentially, embodiments may include apertures in the body of the cord holder for receiving one or two ends of a twist tie, which then may be twisted or wrapped around a cord to hold it. A raised receiver slot may be used to receive a twist tie and lock down a cord. The body may have a channel for the wires. The twist tie may be in another raised receiver slot, a slot, or an aperture in the body of the device. Alternatively, one or more slots may be used. The slots may be molded into the body of the device and may similarly receive twist ties. A U-shaped configuration may be used to hold a cord by twisting the configuration until it tightly contacts the cord or pulling the U-shaped configuration down so that it holds the cord between the body and the twist tie. In all configurations, multiple mounting schemes may be used and multiple types of backs that mirror the surface to which the device is attached may be used.

The foregoing discussion discloses and describes merely exemplary embodiments of an organizing device. One skilled in the art will readily recognize from such discussion and from the accompanying drawings and claims that various changes, modifications, and variations can be made therein without departing from the spirit and scope of embodiments of an organizing device as defined in the following claims.

What is claimed is:

1. An organizing device for holding a cord, comprising:
   a body;
   a plurality of rubberized twist ties, the body configured to hold the plurality of rubberized twist ties; and
   an attachment mechanism connected to the body, the attachment mechanism for attaching the body to a surface, wherein the body includes a plurality of paired apertures, each of the plurality of paired apertures holding a first end and a second end of a twist tie of the plurality of twist ties such that a loop in the twist tie is formed, the twist tie held in the paired apertures by a first end cap and a second end cap of the twist tie, an uncompressed width of the first and second end caps of the twist tie being greater than a width of the paired apertures, wherein the loop has a first position slid up from the body and a second position slid down around a cord against the body.

2. The organizing device of claim 1 wherein each of the plurality of paired apertures is adjacent to a labeling area, the labeling area for indicating an identity of an object held by the twist tie associated with the paired apertures adjacent.

\* \* \* \* \*